United States Patent [19]
Harano et al.

[11] Patent Number: 5,863,157
[45] Date of Patent: Jan. 26, 1999

[54] THROWAWAY BALL END MILL

[75] Inventors: Makoto Harano; Toshiyuki Sakai; Yuko Kitou, all of Nakatosacho, Japan

[73] Assignee: Ryoco Seiki Co., Ltd., Kochi Prefecture, Japan

[21] Appl. No.: 845,043

[22] Filed: Apr. 18, 1997

Related U.S. Application Data

[63] Continuation-in-part of Ser. No. 614,696, Mar. 13, 1996, abandoned.

[51] Int. Cl.⁶ ........................................... B23C 5/22
[52] U.S. Cl. ........................ 407/42; 407/48; 407/104; 408/233
[58] Field of Search ............................... 407/40, 42, 48, 407/103, 104, 110; 408/233, 713

[56] References Cited

U.S. PATENT DOCUMENTS

| | | | |
|---|---|---|---|
| 1,047,466 | 12/1912 | Wagner | 408/233 |
| 2,400,856 | 5/1946 | Thompson | 408/233 |
| 3,776,656 | 12/1973 | Benjamin | 408/233 |
| 4,566,828 | 1/1986 | Reinauer | 407/42 |
| 5,064,316 | 11/1991 | Stojanovski | 407/48 |
| 5,782,589 | 7/1998 | Cole | 408/233 |

*Primary Examiner*—Steven C. Bishop
*Attorney, Agent, or Firm*—Lockwood, Alex, FitzGibbon & Cummings

[57] ABSTRACT

A throwaway ball end mill comprising an end mill body and a tip pressed by a clamp screw onto a cutout formed at the forward end of the end mill body. The cutout is formed in a longitudinal direction with respect to the end mill body, and a pair of lateral regions forked by the cutout have opposite flat surfaces, the lateral regions have clamp holes formed in a direction making a right angle with the cutout, one clamp hole has a conical surface extending toward the periphery of the corresponding lateral region, and the other clamp hole has a female thread formed therein, the centerline of the conical surface is deviated from that of the clamp holes toward the base end of the end mill body. When the clamp screw is tightened with the tip inserted in the cutout, the tip is pressed against the end of the cutout accordingly, and at the same time one lateral region is bent toward the other lateral region.

11 Claims, 10 Drawing Sheets

PRIOR ART

PRIOR ART

FIG.13

THROWAWAY BALL END MILL

CROSS-REFERENCE TO RELATED APPLICATION

This is a cotinuation-in-part application of U.S. patent application Ser.No.08/614,696 filed Mar. 13,1996.

BACKGROUND OF THE INVENTION

1. Field of the Invention

This invention relates to a throwaway ball end mill and finds application chiefly in the finishing of dies of which high finished accuracy is required.

2. Description of the Related Art

Figure 9:
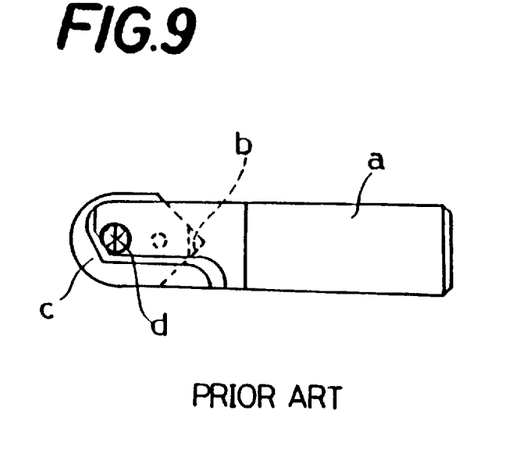
FIG. 9 is a plan view showing the conventional ball end mill.

In the conventional throwaway ball end mill of this kind, the cutout provided in the forward end of an end mill body a is either configured to present a flat tip-receiving surface at the bottom or, as disclosed in Japanese Kokai Utility Model Koho H6-53012, configured to present a V-shaped tip-receiving surface b (FIG. 9). Moreover, the rear end face of a tool tip c which is to contact such tip-receiving surface is also configured to present a flat or V-shaped surface corresponding to the tip receiving-surface, and the tip c inserted into the cutout is rigidly secured to the end mill body a under the fastening force of a screw element d set at right angles with the axis of said cutout.

However, in the former arrangement where the tip having a flat rear end face is secured to the end mill body formed with a flat tip-receiving surface, the alignment of the end mill body with the tip is variable according to the accuracy of the screw hole in the tip and the holder pin hole, and the accuracy of the clamp pin and/or the manner of attachment of the tip. Therefore, this arrangement is not satisfactory for the mill for use as a finishing ball end mill for jobs of which high finished accuracy is required.

Furthermore, the variation in the degree of alignment between the end mill body and the tip is also dependent on the relative positional accuracy of the set holes provided in the two elements and it is impossible to compensate for the variation in alignment at locking.

In the latter arrangement where the tip c has a V-shaped projecting rear end face, the variation in alignment or centering between the end mill body a and the tip c is dictated by the accuracy of the relative positions of the V-shaped tip receiving surface c and the mounting hole in the tip c. But high finished accuracy can hardly be expected technically in the V-shaped tip receiving surface b, and the above misalignment cannot be corrected at the time of fixing the tip c. So a ball end mill of this type cannot be reliably employed as a finishing end mill for jobs demanding high finished accuracy.

Moreover, because the tip c is installed in plane contact with the flat or V-shaped tip receiving surface b of the end mill body a, the incidence of variation in plane accuracy or in the angle of the V-shaped surface detracts from the finished accuracy of the work.

SUMMARY OF THE INVENTION

Having been developed in view of the above circumstances, this invention has for its object to provide a throwaway ball end mill capable of positive self-aligning the centerline of the tip with the centerline of its end mill body in the mounting of the tip on the end mill body to thereby implement a remarkable improvement in the finished accuracy of the work.

In the present invention, a throwaway ball end mill comprises an end mill body and a tip with a cutter means pressed by a clamp screw onto a cutout formed at the forward end of the end mill body, characterized in that the cutout is formed in a longitudinal direction with respect to the end mill body; a pair of lateral regions forked by the cutout have opposite flat surfaces in parallel to each other; the lateral regions have clamp holes formed in a direction making a right angle with the cutout; one clamp hole has a conical surface extending toward the periphery of the corresponding lateral region; the other clamp hole has a female thread formed therein; and the centerline of the conical surface is deviated from that of the clamp holes toward the base end of the end mill body.

The above construction makes it possible that when the clamp screw is tightened with the tip inserted in the cutout, the tip is pressed against the end of the cutout accordingly, and at the same time one lateral region is bent toward the other lateral region.

DETAILED DESCRIPTION OF THE PREFERRED EMBODIMENTS

Figure 1:
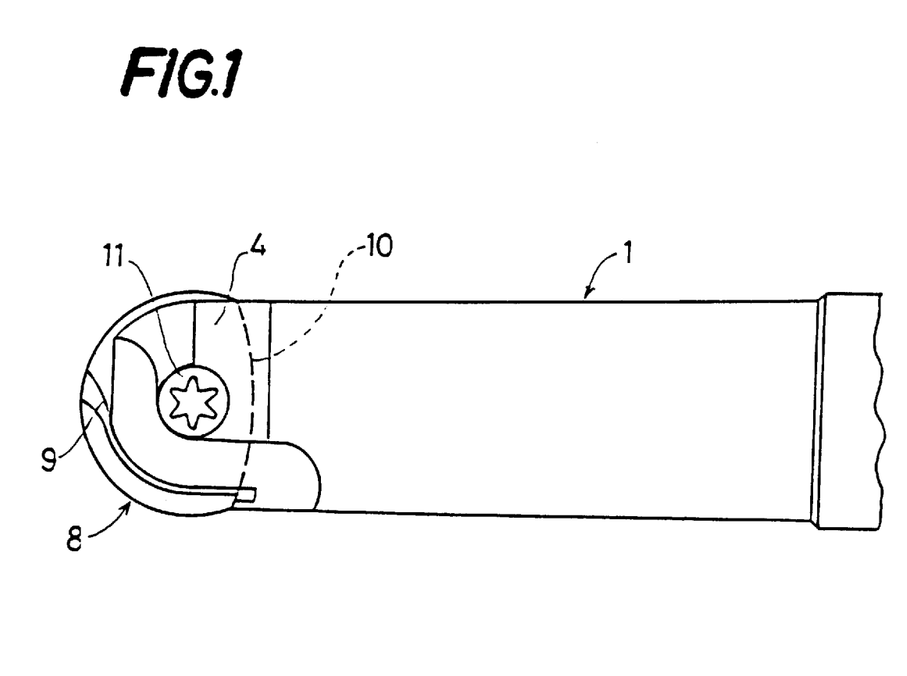
FIG. 1 is a plan view showing an embodiment of this invention.
Figure 2:
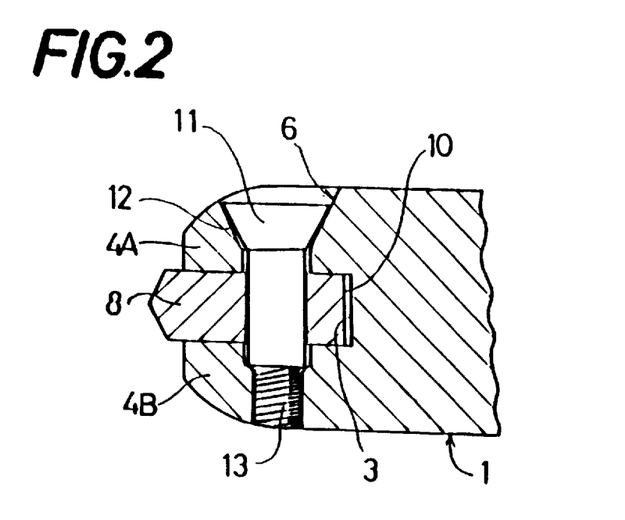
FIG. 2 is a longitudinal cross-section view showing the forward end portion of the ball end mill tool with a tip installed in position.
Figure 3:
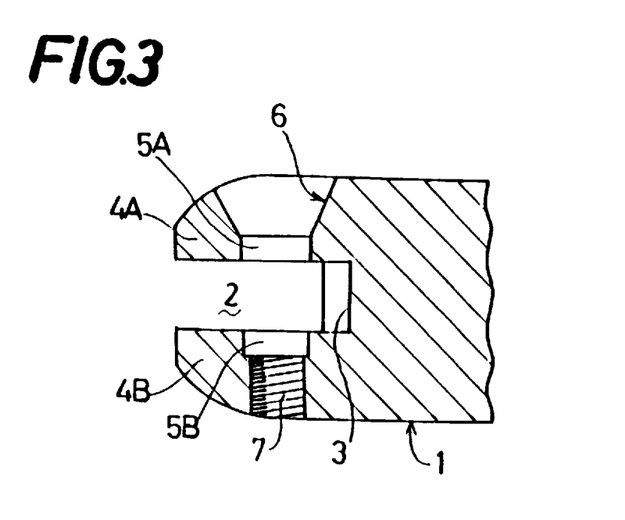
FIG. 3 is a longitudinal cross-section view of the forward end portion of the end mill body.
Figure 4:
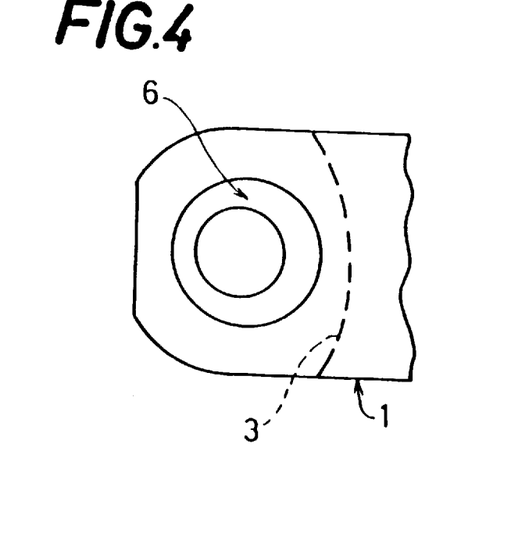
FIG. 4 is a plan view of the forward end portion of the end mill body.

An end mill body 1 which is circular in cross-section is formed with a longitudinally extending tip-receiving cutout 2 centrally disposed in its forward end portion(FIGS. 1–3), and said cutout 2 is defined, in part, by a bottom wall forming an arcuately recessed tip-receiving surface 3 with the center of the arc lying on the centerline of the end mill body 1 (FIGS. 3–4).

Lateral regions 4A, 4B of the end mill body on both sides of the cutout 2 are provided with mutually aligned clamp holes 5A, 5B which extend through the respective regions 4A, 4B at right angles with the axis of said cutout 2.

The reference numeral 8 indicates a tabular tip to be installed in the cutout 2 of the end mill body 1. This tip 8 is provided with an arcuate cutter 9 which projects from the forward end of the end mill body 1 when the tip 8 is mounted in the end mill body 1. The rear end 10 of the tabular tip 8 faces the tip-receiving surface 3 formed into an arcuate recess. The rear end 10 has a radius of curvature which is equal to or larger than the radius of curvature of said tip-receiving surface 3.

In order that the tip 8 may be snugly installed in the cutout 2, the tip 8 is designed to have a thickness slightly smaller than the distance between the opposed regions 4A,4B of the end mill body 1.

A clamp screw member 11 for locking the tip 8 firmly in the cutout 2 comprises a head portion having a conical peripheral surface 12 meeting said conical surface 6, a polished intermediate portion, and a shank portion 13 formed with a thread engaging with said female thread 7.

As mentioned above, the lateral regions 4A, 4B have the clamp holes 5A, 5B in a direction making a right angle with the cutout 2, and the conical surface 6 is formed in the upper clamp hole 5A, and the female thread 7 in the lower clamp hole 5B.

The clamp holes 5A, 5B have a single centerline as shown by the chain line(FIG. 10), while the centerline of the conical surface 6 is deviated toward the base portion(shown right) of the end mill body 1 and does not correspond to that of the clamp holes 5A, 5B.

Figure 10:
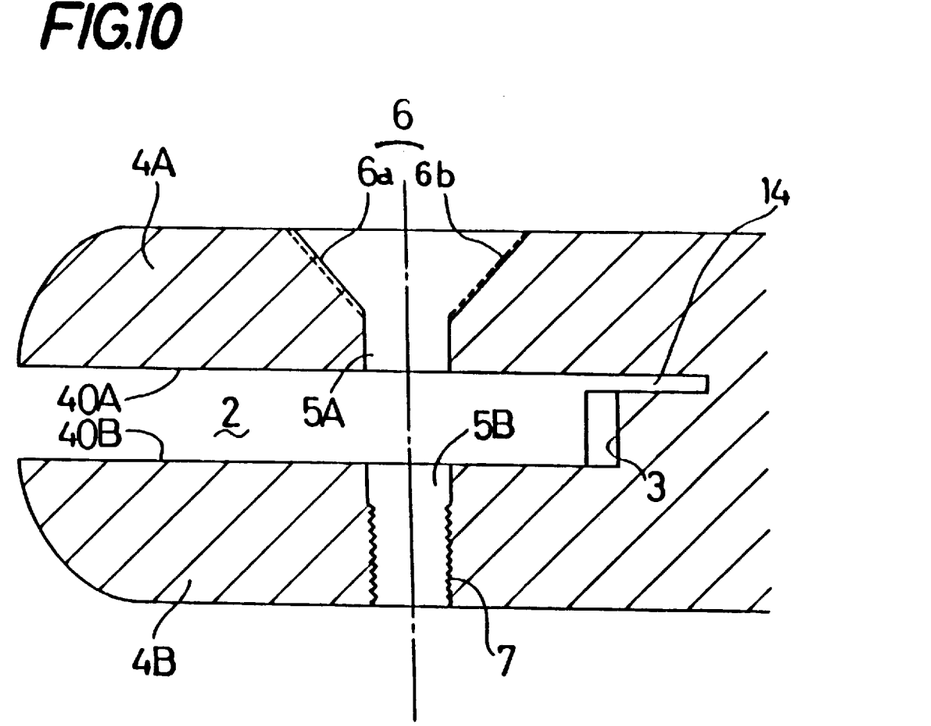
FIG. 10 is a detailed view of FIG. 7.
Figure 11:
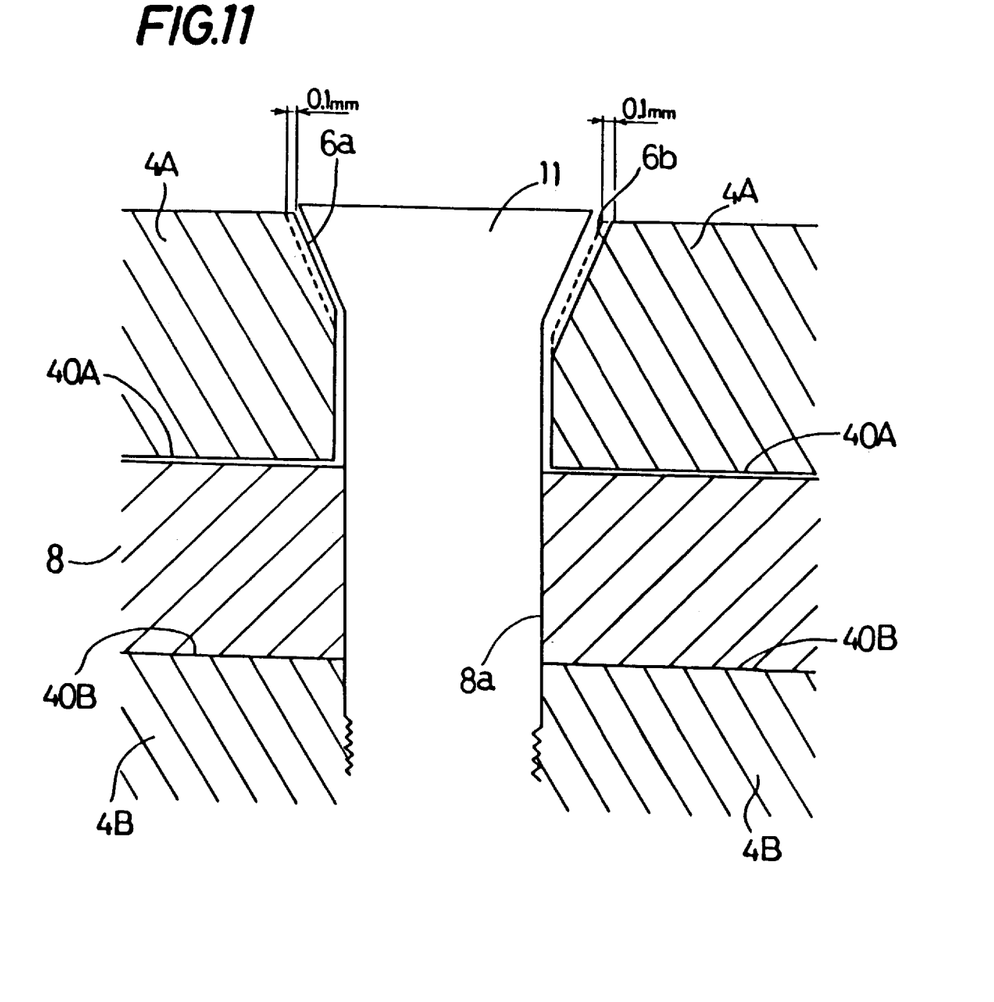
FIG. 11 is an enlarged view of FIG. 10.

If its centerline corresponds to that of the clamp holes 5A, 5B, the conical surface 6 is formed as shown by the broken line(FIGS. 10–11). In the present invention, with its centerline deviated rightward, the conical surface 6(6a, 6b) is formed as shown by the solid line(FIGS. 10–11). In the embodiment, the deviation of the centerline of the conical surface 6 from that of the clamp holes 5A, 5B is 0.1 mm.

The clamp screw 11 is made so as to have the intended outer diameter R, but the actual outer diameter is R+Δr because of the error Δr. In the embodiment, production is controlled so that the error Δr is within the range of +0 $\mu$m~+5$\mu$m.

Likewise, production control ensures that the error Δr of the insertion hole 8a of the tip 8 is within the range of +15$\mu$m~+23$\mu$m and that of the clamp hole 5B within the range of +5 $\mu$m~+15 $\mu$m.

Consequently, the clamp screw 11 is practically fixed by the clamp hole 5B, and when its top 11a is pushed rightward, the clamp screw 11 is inclined rightward and slightly bent rightward.

Figure 5:
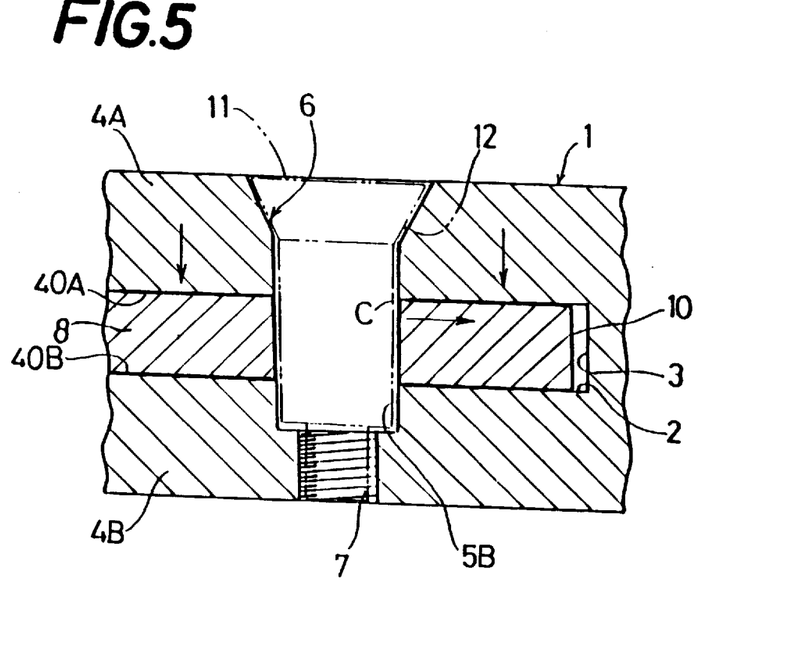
FIG. 5 is an elementary longitudinal view showing the state of the tip fastened by the clamp screw member.
Figure 6:
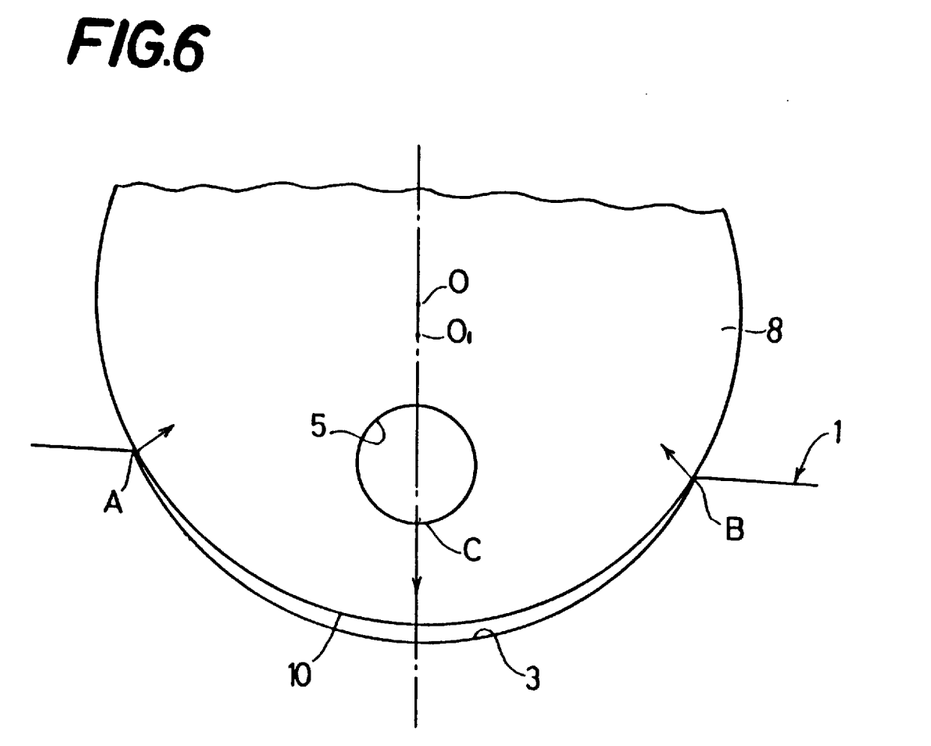
FIG. 6 is an elementary plan view showing the fastened state of the rear end face of the tip.

In the above embodiment, as the tip 8 is inserted into the cutout 2 formed in the end mill body 1 and the clamp screw 11 is tightened, the head of the clamp screw 11 is subjected to the pressure from the conical surface 6a and slightly flexed toward the base portion(right) of the end mill body 1, so that the tip 8 is forced against the tip receiving surface 3 at the point C. At the same time, the force pressing the conical surface 6 downward causes the lateral surfaces of the tip 8 to be firmly held by flat surfaces 40A, 40B(FIGS. 5–6).

Where the radius of curvature of the rear end face 10 of the tip 8 is larger than the radius of curvature of the tip receiving surface 3, the center 0 of the arc 10 is moved to lie on a straight line which divides the chord interconnecting the two points A, B into two equal portions and is perpendicular to said chord, so that the centerline of the tip 8 coincides with the centerline of the end mill body 1. In addition to the above feature, the tip 8 is supported by the three forces acting at said contact points A, B and C, with the result that the tip 8 is securely retained in position (FIG. 6). The finished accuracy of work is dependent on the degree of alignment between the centerline of tip 8 and the centerline of the end mill body 1 and the firm locking of the tip 8 and, therefore, the finishing accuracy is remarkably improved when the ball end mill of this embodiment is employed.

Where the radius of curvature of the rear end face 10 of tip 8 is equal to the radius of curvature of the tip-receiving surface 3, the two arcuate surfaces contact each other throughout the whole area, and the center 0 of the arc 10 is moved so that the centerline of tip 8 coincides with the centerline of the end mill body 1. As a result, the finishing accuracy is remarkably improved.

Figure 7:
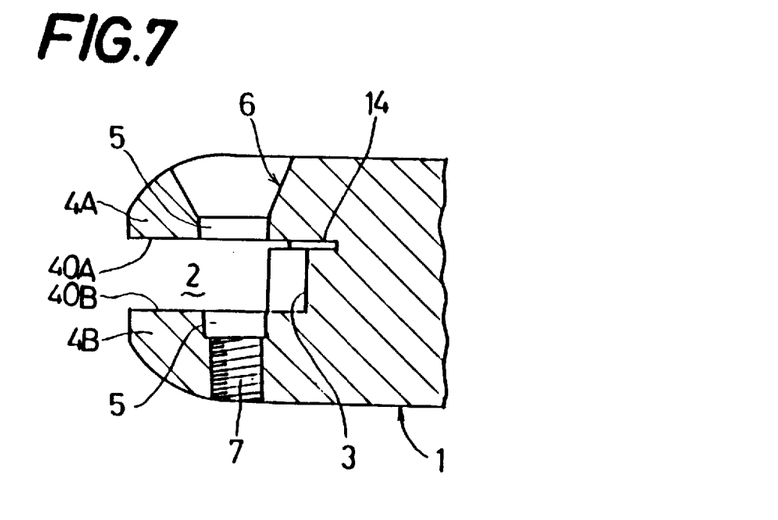
FIG. 7 is an elementary longitudinal cross-section view showing another example of the end mill body.

Referring now to FIG. 7 which shows another embodiment of this invention, the end mill body 1 is provided with a slot 14 extending a predetermined distance from the tip-receiving surface 3 toward the base of the end mill body along the inner wall 40A of the region 4A. That is, the slot 14 is formed continuously in one of the parallel opposite surfaces 40A, 40B.

In this arrangement, the slot 14 assists in the flexure of said region 4A of the end mill body toward the cutout 2 so that the tip 8 is still more positively held in position by the regions 4A, 4B on both sides of the cutout 2 and, therefore, a further improvement in finishing accuracy is assured.

Figure 12:
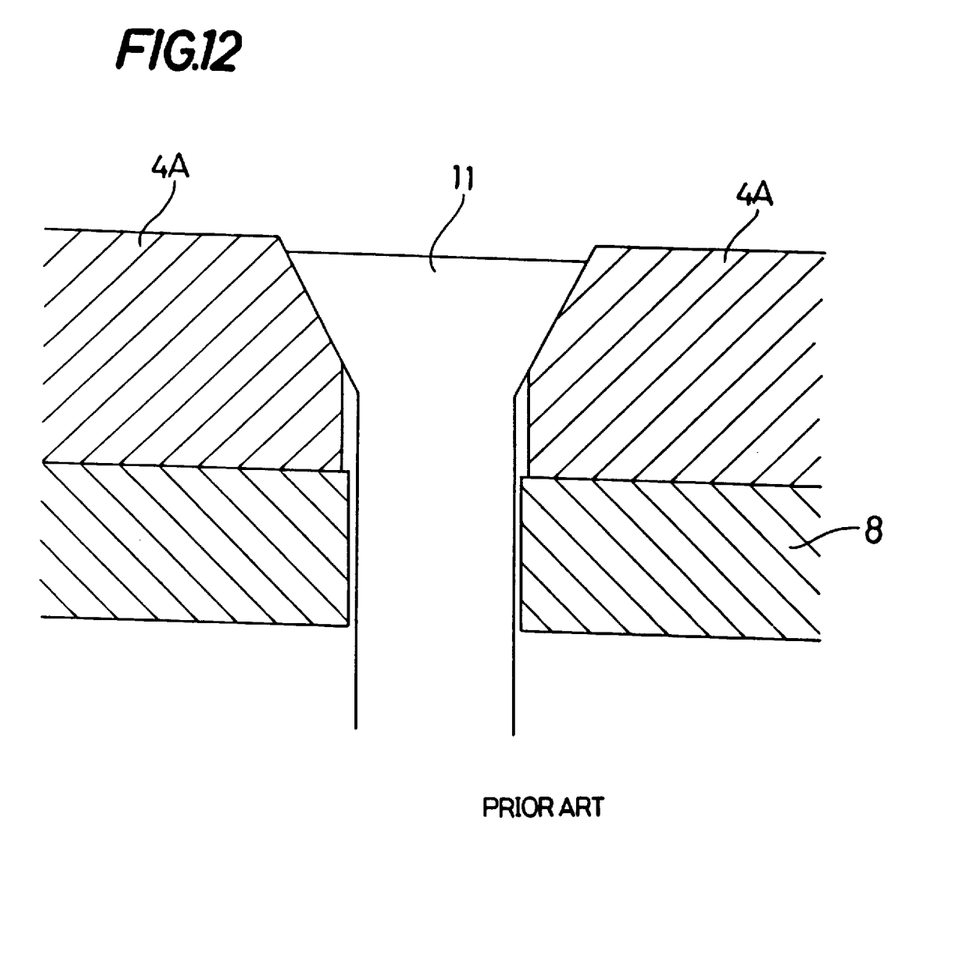
FIG. 12 is a view showing the operations of the prior art.
Figure 13:
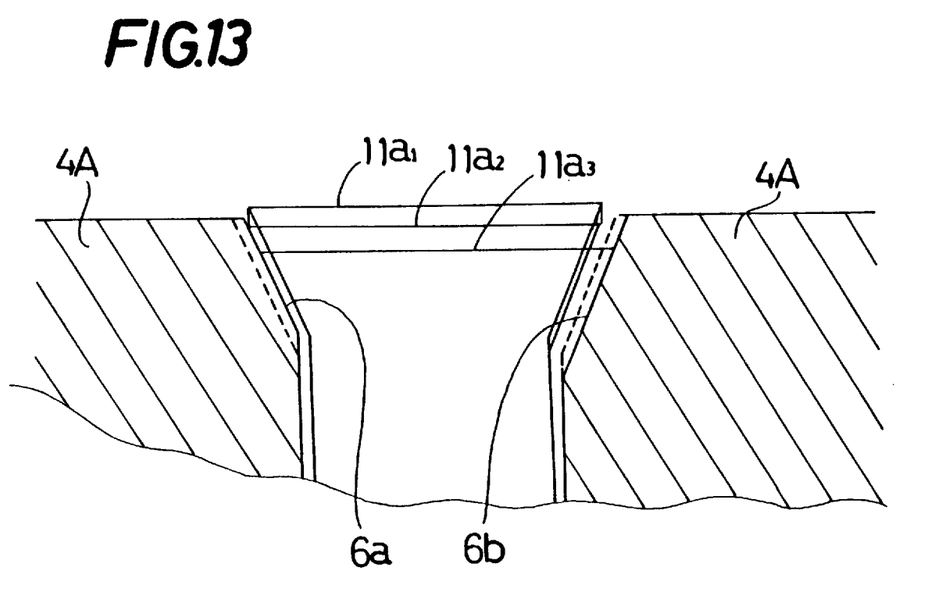
FIG. 13 is a view showing the operations of the present invention.

Operations when the clamp screw 11 is tightened (inventions shown in FIGS.3 and 7):

(1) As shown by the broken lines in FIGS. 10 and 11, if the centerline of the conical surface 6 corresponds to that of the clamp holes 5A, 5B, the clamp screw 11 is brought into uniform contact with the whole conical surface 6, as the tip 8 is inserted in the cutout 2, and the clamp screw 11 tightened(FIG.12). Even if further tightened, the clamp screw 11, which is inserted straight, does not affect the positioning of the tip 8 at all.

(2) In the inventions shown in FIGS. 3 and 7, however, the conical surface 6 is formed with a deviation of 0.1 mm. from the clamp holes 5A, 5B as shown by the solid lines in FIGS.10 and 11.

If, therefore, the tip 8 is inserted in the cutout 2, and the clamp screw 11 tightened, the top 11a is inserted straight from the position 11a$_1$, to the position 11a$_2$. But in the position 11a$_2$, the top 11a of the clamp screw 11 is brought into contact with the forward(left) portion 6a of the conical surface 6. Since the centerline of the conical surface 6 is deviated rightward by 0.1 mm. from that of the clamp holes 5A, 5B, it will be understood that at this state the clamp screw 11 does not contact the base portion 6b(right) of the conical surface 6.

(3) If further tightened, the clamp screw 11 is prevented from advancing by the left lateral region 4A. So the clamp screw 11 is slightly bent rightward while inclined rightward, and its top 11a moves from the position 11a$_2$ to the position 11a$_3$.

As the top 11a of the clamp screw 11 moves as above, the clamp screw 11 pushes the tip 8 rightward, and as a result the tip 8 is positioned, firmly held by the tip-receiving surface 3.

In the invention as shown in FIG. 7, the cutout 2 has the slot 14 at its upper end, and so when the clamp screw 11 is tightened, the lateral region 4A alone is bent to hold the tip 8. In other words, in the invention of FIG. 7, the lateral region 4B is stationary, not bent. Thus, when held by the opposite surfaces 40A,40B, the tip 8 is positioned with the opposite surface 40B as standard surface.

As mentioned above, in the invention of FIG. 7, only by tightening the clamp screw 11, is the tip 8 positioned accurately and held with the tip receiving surface 3 and opposite surface 40B as standard surfaces. In short, a single screw allows two directional pressing and accurate positioning.

Figure 8:
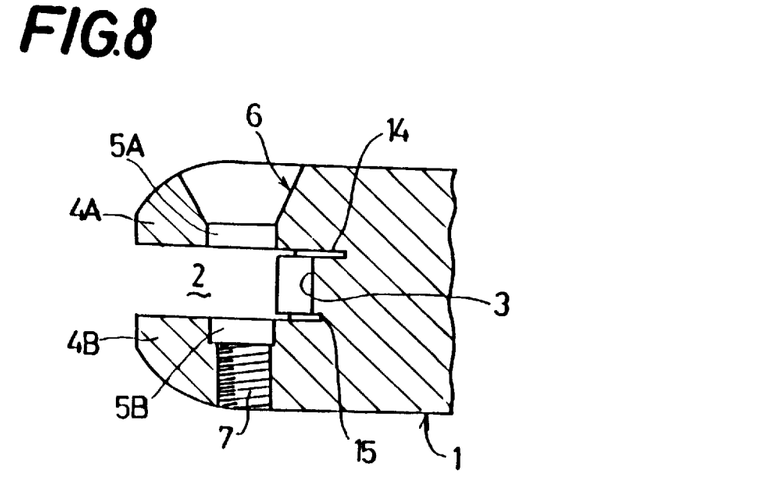
FIG. 8 is a longitudinal cross-section view showing still another example of the end mill body.

Referring to FIG. 8 which shows still another embodiment of this invention, the end mill body 1 is further provided with a second slot 15 extending a relatively short distance from said tip-receiving surface 3 toward the base of the end mill body in addition to the above-mentioned slot 14 provided in the preceding embodiment. The slot 14 is more than twice as deep as the slot 15.

In this arrangement, the tip 8 can be more positively secured in position while the firm engagement of the end mill body 1 with the clamp screw member 11 is not adversely affected.

What is claimed is:

1. A throwaway ball end mill comprising an end mill body and a tip with a cutter means pressed by a clamp screw onto a cutout formed at the forward end of the end mill body, characterized in that:

the cutout is formed in a longitudinal direction with respect to the end mill body, and a pair of lateral regions forked by the cutout have opposite flat surfaces in parallel to each other, the lateral regions have clamp holes formed in a direction making a right angle with the cutout, one clamp hole has a conical surface extending toward the periphery of the corresponding lateral region, and the other clamp hole has a female thread formed therein, the centerline of the conical surface is deviated from that of the clamp holes toward the base end of the end mill body, and thus, when the clamp screw is tightened with the tip inserted in the cutout, the tip is pressed against the end of the cutout accordingly, and at the same time one lateral region is bent toward the other lateral region.

2. A throwaway ball end mill of claim 1 further characterized in that:

the cutout has a slot formed at its end to extend one flat surface.

3. A throwaway ball end mill of claim 1 further characterized in that:

the base end of the tip is formed as an arc having a first radius of curvature, the end of the cutout has an arc having a second radius of curvature, and the first radius of curvature is set larger than the second radius of curvature.

4. A throwaway ball end mill for receiving a tip with a cutter means at a forward end portion of the throwaway ball end mill comprising:

an end mill body including a base end portion and a forward end portion having a cutout formed therein along a longitudinal axis of said end mill body;

said cutout having first and second parallel lateral regions and a tip-receiving surface;

said first and second parallel lateral regions having mutually aligned first and second clamp holes respectively formed therein, wherein a mutual centerline of said clamp holes is perpendicular to said longitudinal axis of said end mill body;

said first clamp hole having a conical recess formed therein extending through said first lateral region;

said second clamp hole having a female thread formed therein; and a centerline of said conical recess being offset from said mutual centerline of said aligned first and second clamp holes in the direction of said base end portion of said end mill body, whereby upon tightening of said end mill body using a clamp screw having a tip inserted in said cutout, said tip is guided in the direction of said base end portion, thereby pressing said tip against said tip-receiving surface of said cutout and bending said lateral regions toward each other.

5. The throwaway ball end mill of claim 4, further having at least one slot extending a predetermined distance from the tip-receiving surface toward the base end portion of the end mill body along an inner wall of at least one of the lateral regions.

6. The throwaway ball end mill of claim 4, wherein an end portion of said tip is arcuate-shaped having a first radius of curvature, and said tip-receiving surface is arcuately recessed having a second radius of curvature wherein the first radius of curvature is at least as large as the second radius of curvature.

7. The throwaway ball end mill of claim 4, wherein the centerline of said conical recess is offset from said mutual centerline of said first and second clamp holes by about 0.1 millimeters.

8. A throwaway ball end mill comprising:

an end mill body having a base end and a forward end, a cutout formed by first and second peripheral portions at said forward end sized and shaped to receive a tool tip therein;

said cutout having an arcuately recessed tip-receiving surface;

said tool tip having an arcuately-shaped rear end face that is sized and shaped to be positioned against said tip-receiving surface;

said rear end face having a radius of curvature at least as large as the radius of curvature of said tip-receiving surface;

said first and second peripheral portions having first and second mutually aligned clamp holes formed therein respectively;

said first clamp hole having a partially flared conical portion that extends through said first peripheral portion, said conical portion having a centerline that is offset from a mutual centerline of said mutually aligned clamp holes; and a clamp screw inserted into said mutually aligned clamp holes for effecting the mounting into and tightening of said tool tip into said cutout of said end mill body with the rear end face of said tool tip being forced against the tip-receiving surface and said first and second peripheral portions providing a gripping engagement with said tool tip.

9. The throwaway ball end mill of claim 8, wherein the end mill is further provided with at least one slot extending from said tip-receiving surface toward the base end of the end mill body in contiguity with said cutout for providing an increased flexure of said peripheral portions in gripping said tool tip upon tightening of said tool tip in said cutout of said end mill body.

10. The throwaway ball end mill of claim 8, wherein said centerline of said conical portion is offset from said mutual centerline of said first and second mutually aligned clamp holes by about 0.1 millimeters.

11. The throwaway ball end mill of claim 8, wherein said second clamp hole has a female thread formed therein.

* * * * *